Patented May 25, 1937

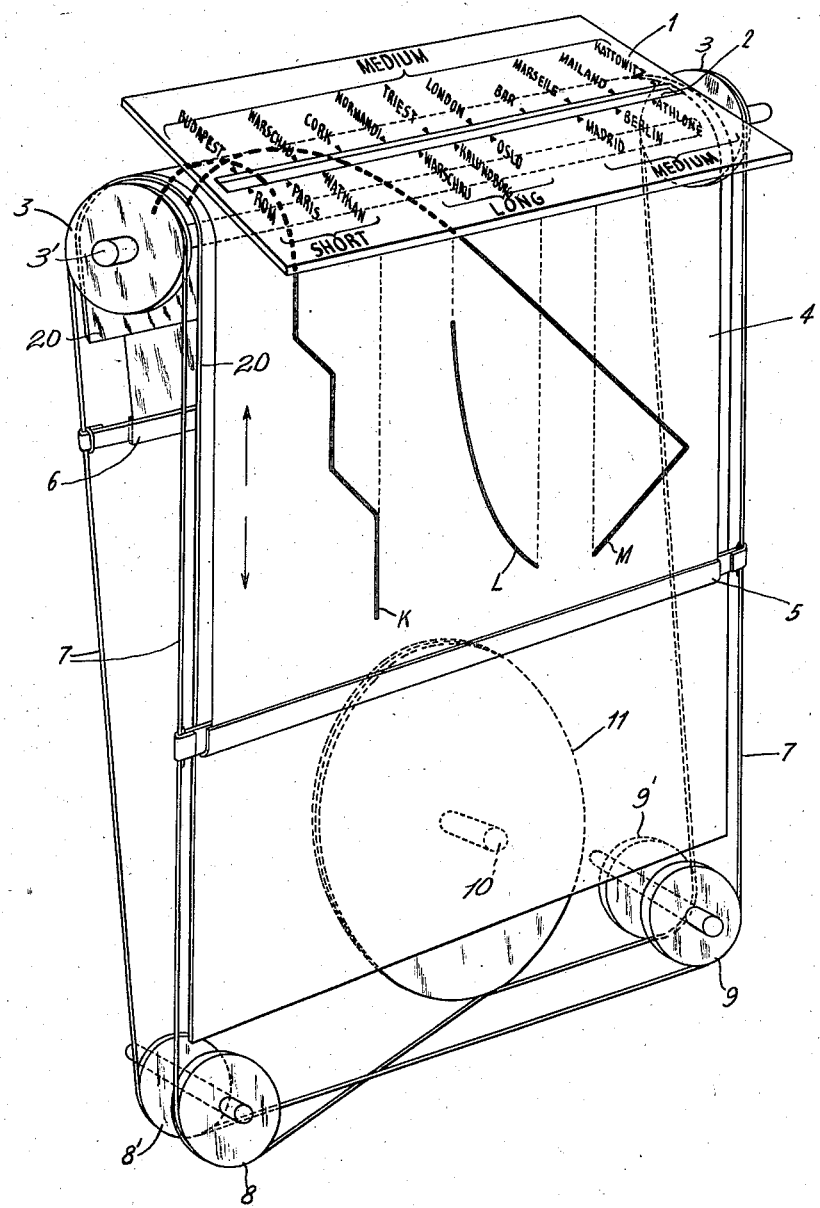

2,081,278

UNITED STATES PATENT OFFICE 2,081,278

STATION SCALE FOR RADIO RECEIVER SETS

Erwin König, Berlin-Neukoelln, Germany, assignor to Allgemeine Elektricitatz Gesellschaft, Berlin, Germany, a corporation of Germany Application November 19, 1934, Serial No. 753,653
In Germany December 8, 1933

3 Claims. (Cl. 116—124.1)

This invention is concerned with a station scale for broadcast receiving apparatus. Station scales are known in the prior art in which the station names are arranged laterally in reference to one or more slots and where the reading is along an oblique straight line at right angles to the slot.

One disadvantage of station scales of this kind is that the device used for the reading in large-scale manufacture of sets can be designed only after a large number of sets has been finished. For if unduly great disparities in the readings are to be avoided, it is first necessary to find the average of a large number of sets before the scale or reading device can be made. And yet, in spite of such a procedure the deviations in the readings of some of the apparatus of a large series will be rather serious and thus the setting error quite large for them.

These station scales moreover involve the drawback that owing to the irregular distribution of stations inside the various wave-length ranges a non-uniform distribution of the station names on the scale will be unavoidable. For example, inside the range occupied by the long waves the number of stations contained therein is comparatively limited and the distribution of the station names rather sparse and far between, whereas inside the range occupied by the waves and stations of medium length, the names will be crowded together.

In order that all of these drawbacks may be avoided there is co-ordinated to each slot a reading curve traced on a scale or curve-sheet conducted and guided at right angles to the slot. In this manner it is possible, even at the beginning of manufacture, in all sets of a series, to use the same station scale on which the station names are all disposed in an identical manner. In each individual receiver by adjusting it to a few readily available stations a sufficient number of reading points can be marked upon the rolling curve-sheet co-ordinated to the scale so that the reading curve can be easily traced for each set.

By the use of such curves the additional advantage is obtained that the station names of the different wave-length ranges can be distributed suitable distances apart, and this means a great simplification in the accommodation and the reading of the station names. For instance, by suitable guiding of the reading curve it will be readily feasible to distribute the station names on the scales quite uniformly or nearly so.

One exemplified embodiment of the station scale of this invention will be described in detail by reference to the attached drawing which is a schematic representation of the invention and in which, I denotes a plate having a slot 2, the said plate I being preferably arranged on the upper front edge of the receiver. Laterally in reference to the slot are indicated the station names, say, by printing. Movable behind the slot 2 is a flexible scale or calibration curve sheet 4 whose ends are clamped or secured to the cross strips 5 and 6 and whose upper end passes over the curved upper end of a stationary guide plate 20 which guides the curve sheet behind the slot 2. Strip 5 is raised as strip 6 is lowered by means of a cord or belt drive 7 which passes over two pulleys 3 secured to a shaft 3' mounted at the rear of plate I. The cord drive 7 also passes over idler pulleys 8, 8' and 9, 9' as shown, onto a main drive pulley II secured to the tuning condenser shaft 10. It results that upon the operator rotating the tuning shaft 10, the calibration sheet 4 will be raised or lowered and the curves thereon moved behind slot 2.

Instead of making the plate I bearing the station names fixed and causing the curve-sheet 4 to roll on or reel off, the condition could also be reversed by clamping the curve-sheet 4 over its entire length, while causing the plate I to move up and down along the curve-sheet 4, though in this instance the plate I should be suitably coupled with the spindle 10 of the condenser.

Now, marked upon the curve-sheet 3 are reading curves K; L, M, curve K being co-ordinated to the station names comprised within the short-wave range, curve L to the station names of the long wave range, and curve M to the stations contained in the medium-wave-length range. Now, in order that in reading the co-ordination of the curves to the station names belonging to the various wave-length ranges and listed laterally along the slot may be facilitated, it is advantageous to choose for the curve pertaining to a given wave-length range as well as the station names falling inside such range the same color, and to select dissimilar colors for the various ranges, say, blue for the short-waves, red for the long waves, and green for the medium waves. As can be seen from the drawing, the reading curve for the medium range is bent at its lower end in order that a row of station names belonging to the medium-wave range whose list is very long may be accommodated not only upon one side of the slot, but a part also upon the opposite side of the slot. The remainder of the slot will then be allotted to the long and the short waves which comprise fewer stations so that the respective names can be accommodated within a smaller amount of space. In this manner a fairly uniform spacing apart of the station names is possible with the result that the accommodation thereof along the slot will not meet with any difficulties. The tracing of the curves K, L, M, upon the curve-sheet may be secured in this manner that inside each wave-length range the set is tuned to a sufficient number of stations and that in each case for the corresponding station names a mark on the curve sheet in the slot is made; and then a curve is traced through the points marked on the sheet, resulting in a reading or calibration curve.

Having described my invention, what I claim and desire to secure by Letters Patent is:

1. In an indicator for a tuning device, the combination of a plate having an elongated aperture therein, a series of short wave station indicia marked on said plate at one side of said aperture, a series of medium wavelength station indicia marked on said plate at the opposite side of said aperture, a flexible sheet connected to said tuning means and having a portion visible through said aperture, a line marked on said sheet and cooperating with said short wave station indicia to indicate the corresponding settings of said tuning means and a second line marked on said sheet cooperating with said medium wavelength station indicia to indicate the corresponding settings of said tuning means.

2. In an indicator for a tuning means, the combination of a plate, a plurality of station names marked on one side of said plate, a stationary curved guide member mounted behind said plate and having a pulley near each end thereof, a shaft connected to said tuning means, a pulley on said shaft, a flexible drive means passing over each of the aforesaid pulleys, a flexible sheet passing over and frictionally engaging said curved guide member, means connecting the ends of said sheet to spaced apart points on said flexible drive means and a curve marked on said flexible sheet and cooperating with said station names to indicate the corresponding settings of said tuning means.

3. In an indicator for a tuning means, the combination of a plate having a plurality of station names marked on one side thereof, a curved guide member mounted behind said plate and having a pulley near each end thereof, a plurality of idler pulleys mounted at right angles to said pulleys, a drive pulley mounted between said idler pulleys and connected to said tuning means, a flexible drive passing over each of the aforesaid pulleys, a flexible piece of sheet material frictionally engaging said curved guide, means connecting the ends of said sheet material to spaced apart points of said flexible drive and a curve marked on said sheet and cooperating with said station names to indicate the corresponding settings of said tuning means.

ERWIN KÖNIG.